(12) United States Patent
Yamasaki et al.

(10) Patent No.: US 11,338,828 B2
(45) Date of Patent: *May 24, 2022

(54) AUTOMATED DRIVING ENABLED VEHICLE

(71) Applicant: SUBARU CORPORATION, Tokyo (JP)

(72) Inventors: Kentarou Yamasaki, Tokyo (JP); Makoto Kinoshita, Tokyo (JP); Keisuke Takayama, Tokyo (JP); Yuta Muramatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 16/983,614

(22) Filed: Aug. 3, 2020

(65) Prior Publication Data

US 2021/0094584 A1  Apr. 1, 2021

(30) Foreign Application Priority Data

Sep. 26, 2019  (JP) .............................. JP2019-175675

(51) Int. Cl.
*B60W 60/00* (2020.01)
*B60Q 1/50* (2006.01)
(Continued)

(52) U.S. Cl.
CPC ........... *B60W 60/0053* (2020.02); *B60Q 1/50* (2013.01); *B60W 50/0205* (2013.01);
(Continued)

(58) Field of Classification Search
CPC ......... B60W 60/0053; B60W 60/0015; B60W 50/0205; B60W 50/14; B60W 2050/021; B60W 2050/143; B60Q 1/50
See application file for complete search history.

(56) References Cited

U.S. PATENT DOCUMENTS 10,053,001 B1  8/2018  Nabbe et al.
10,665,155 B1  5/2020  Rao
(Continued)

FOREIGN PATENT DOCUMENTS

JP  2018-032433 A  3/2018
JP  2019-064471 A  4/2019

OTHER PUBLICATIONS

U.S. PTO Non-Final Office Action issued in related U.S. Appl. No. 16/983,674, dated Apr. 29, 2021.
(Continued)

*Primary Examiner* — Nicholas Kiswanto
*Assistant Examiner* — Jamal A Shah
(74) *Attorney, Agent, or Firm* — McDermott Will & Emery LLP

(57) ABSTRACT

An automated driving enabled vehicle includes a travel controller, an automated driving indicator lamp, and a lamp controller. The lamp controller switches off the automated driving indicator lamp during the execution of automated driving, on the condition that the vehicle executing the automated driving is traveling in an exclusive place for the automated driving. On the condition that a surrounding moving body is present around the vehicle while the vehicle is traveling by the automated driving in the exclusive place for the automated driving, with the automated driving indicator lamp off, the lamp controller switches the automated driving indicator lamp back on during the execution of the automated driving, in accordance with attributes of the surrounding moving body with respect to the exclusive place for the automated driving.

14 Claims, 7 Drawing Sheets

(51) Int. Cl.
   *B60W 50/02*   (2012.01)
   *B60W 50/14*   (2020.01)

(52) U.S. Cl.
   CPC ........ *B60W 50/14* (2013.01); *B60W 60/0015*
   (2020.02); *B60W 2050/021* (2013.01); *B60W*
   *2050/143* (2013.01)

(56)                References Cited

U.S. PATENT DOCUMENTS

| 2017/0057542 | A1 | 3/2017 | Kim et al. |
| 2017/0225567 | A1 | 8/2017 | Tsuda |
| 2017/0229053 | A1 | 8/2017 | Ishizuka et al. |
| 2017/0334455 | A1 | 11/2017 | Asakura et al. |
| 2018/0056851 | A1 | 3/2018 | Kim |
| 2018/0086260 | A1 | 3/2018 | Barillot et al. |
| 2018/0304804 | A1 | 10/2018 | Tatara et al. |
| 2018/0334088 | A1* | 11/2018 | Salter ................... B60Q 1/442 |
| 2019/0084585 | A1 | 3/2019 | Fritz et al. |
| 2019/0111784 | A1 | 4/2019 | Tsuda |
| 2019/0168664 | A1 | 6/2019 | Tatara et al. |
| 2019/0210517 | A1* | 7/2019 | Baker ................. G07C 5/0825 |
| 2019/0270406 | A1* | 9/2019 | Dubey ................. G08G 1/166 |
| 2020/0031274 | A1 | 1/2020 | Redick et al. |
| 2020/0130573 | A1 | 4/2020 | Ito |
| 2020/0156532 | A1 | 5/2020 | Lee et al. |

OTHER PUBLICATIONS

U.S. PTO Notice of Allowance issued in related U.S. Appl. No. 16/983,674, dated Sep. 2, 2021.
U.S. PTO Non-Final Office Action issued in related U.S. Appl. No. 16/985,864, dated Mar. 2, 2022.

* cited by examiner

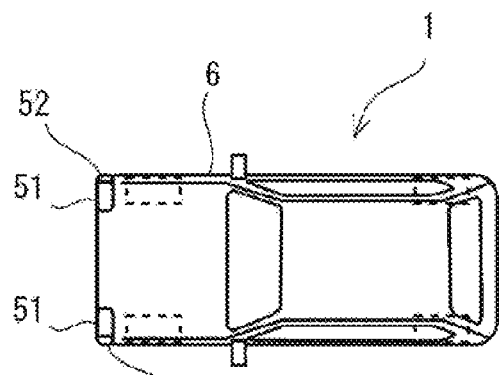
FIG. 1A
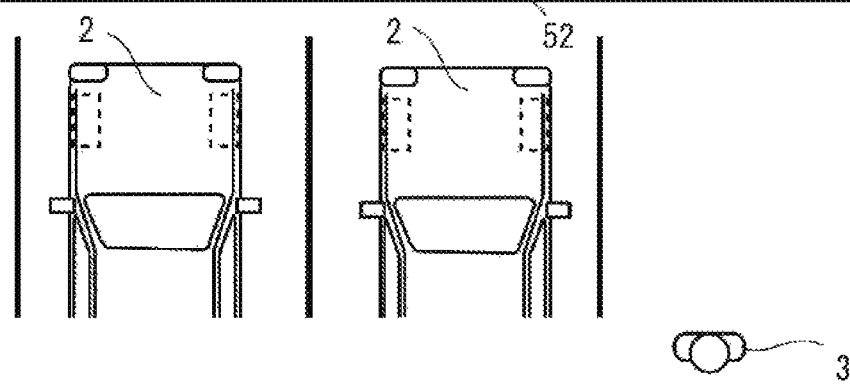
FIG. 1B
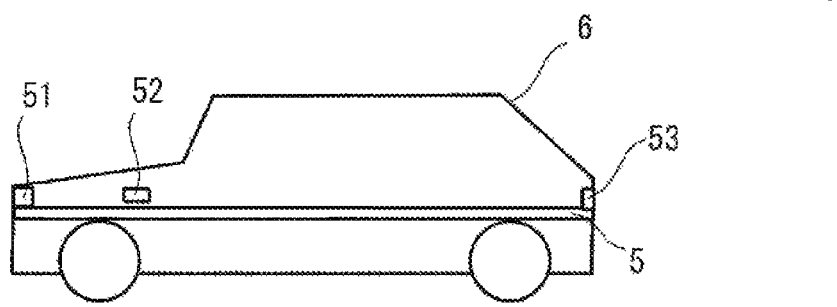
FIG. 1C
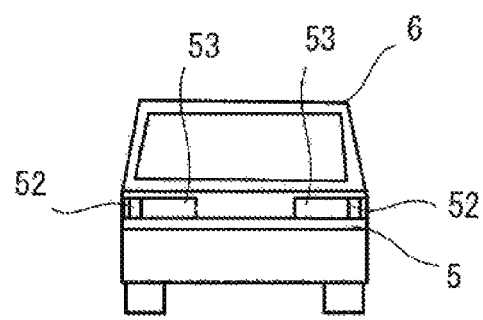

AUTOMATED DRIVING ENABLED VEHICLE

CROSS-REFERENCE TO RELATED APPLICATIONS

This application claims priority from Japanese Patent Application No. 2019-175675 filed on Sep. 26, 2019, the entire contents of which are hereby incorporated by reference.

BACKGROUND

The technology relates to an automated driving enabled vehicle.

As to vehicles, research and development of automated driving, or automation of vehicle travel, has been in progress.

For example, vehicles in the future are expected to travel to a destination by an automatic control in response to setting of the destination, and to stop and park at the destination.

SUMMARY

An aspect of the technology provides an automated driving enabled vehicle including a travel controller, an automated driving indicator lamp, and a lamp controller. The travel controller is configured to control travel of the vehicle while switching a travel control state between automated driving and manual driving. The automated driving indicator lamp is configured to be switched on perceptibly from outside the vehicle on the occasion of the automated driving. The lamp controller is configured to switch on the automated driving indicator lamp to indicate that the travel control state is the automated driving, during execution of the automated driving in which the travel controller controls the travel of the vehicle by the automated driving. The lamp controller is configured to acquire, during the execution of the automated driving, attribute information regarding a place being traveled by the vehicle, and information regarding a surrounding moving body present around the vehicle. The lamp controller is configured to switch off the automated driving indicator lamp during the execution of the automated driving, on the condition that the vehicle executing the automated driving is traveling in an exclusive place for the automated driving. The lamp controller is configured to switch the automated driving indicator lamp back on during the execution of the automated driving, in accordance with attributes of the surrounding moving body with respect to the exclusive place for the automated driving, on the condition that the surrounding moving body is present around the vehicle while the vehicle is traveling by the automated driving in the exclusive place for the automated driving, with the automated driving indicator lamp off.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 1A to 1C are schematic diagrams of an automated driving enabled automobile according to an embodiment of the technology.

DETAILED DESCRIPTION

Figure 2:
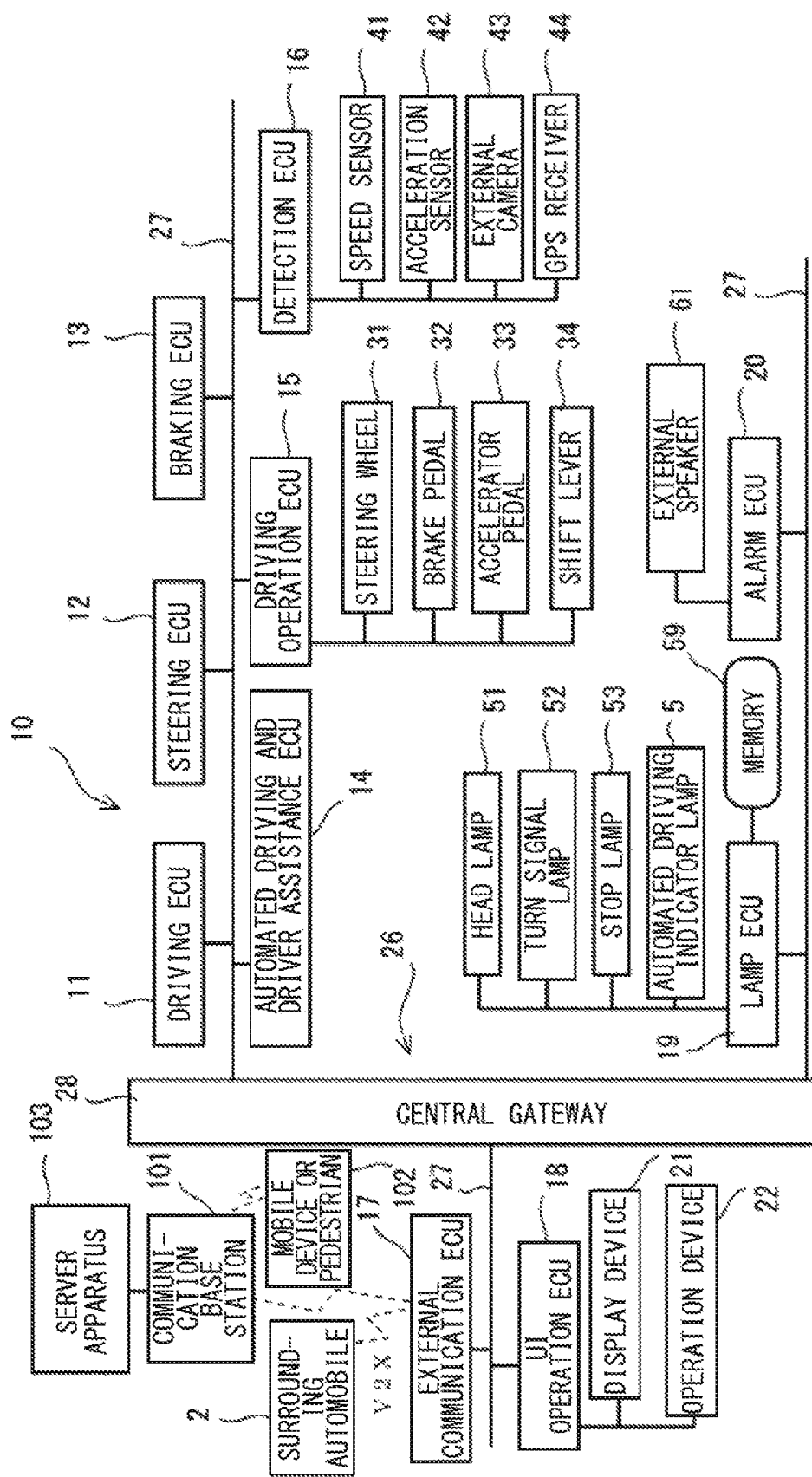
FIG. 2 is a block diagram of a control system of the automobile illustrated in FIGS. 1A to 1C.

The aims of automated driving enabled vehicles may possibly include making appropriate selection of a travel path, a safety check of a course, and an avoidance control of uncertainties, to travel to the destination without an unanticipated incident.

Executing such a control for safer travel, however, would not guarantee safety to 100% perfection. The possibility is that even such a travel control by automated driving enabled vehicles will provide only a limited level of safety.

For example, automated driving enabled vehicles may include an automated driving indicator lamp. Automated driving enabled vehicles may switch on the automated driving indicator lamp perceptibly from outside them, in a case where they are executing automated driving. Reference is made to, for example, Japanese Unexamined Patent Application Publication (JP-A) Nos. 2018-032433 and 2019-064471.

Such an automated driving enabled vehicle switching on the automated driving indicator lamp during the execution of the automated driving makes it possible for occupants of surrounding vehicles or nearby pedestrians to grasp the situation that the vehicle is executing the automated driving, allowing the occupants or the pedestrians to take an action or a prior countermeasure in response to the situation. The surrounding vehicles may be on a road or a lane on which the automated driving enabled vehicle is traveling.

As described, a travel control of automated driving enabled vehicles themselves provides only a limited level of safety in their travel environment. Automated driving enabled vehicles owe their enhanced safety to cooperation with surrounding vehicles and pedestrians.

On the other hand, keeping automated driving indicator lamps on during the execution of the automated driving contributes to an increase in power consumption of automated driving enabled vehicles. In particular, for electrically powered vehicles, a steady increase in power consumption may shorten their cruising ranges and directly affect their travel performance.

Moreover, the possibility in the future is that places dedicated to automated driving will be set. Non-limiting examples of such places may include parking lots where solely automated driving enabled vehicles are permitted to stop and park. Basically, such places dedicated to the automated driving do not assume any entry of pedestrians or vehicles otherwise controlled than the automated driving. However, the possible situation is that someone is in the places dedicated to the automated driving, e.g., staff members who belong to the places dedicated to the automated driving. Moreover, it is difficult to completely ensure that no pedestrians nor vehicles otherwise controlled than the automated driving enter the places dedicated to the automated driving.

As described, automated driving enabled vehicles have had room for improvements.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

FIGS. 1A to 1C are schematic diagrams of an automated driving enabled automobile 1 according to an embodiment of the technology. In the following, the automated driving enabled automobile 1 is also simply referred to as an "automobile 1".

FIGS. 1A to 1C schematically illustrate the automobile 1. In one embodiment of the technology, the automobile 1 may serve as an "automated driving enabled vehicle" or a "vehicle".

FIG. 1A is a top view of the automobile 1. FIG. 1A also illustrates surrounding automobiles 2 and a pedestrian 3. FIG. 1B is a side view of the automobile 1. FIG. 1C is a rear view of the automobile 1.

As illustrated in FIGS. 1A to 1C, the automated driving enabled automobile 1 is configured to travel in a parking lot where the surrounding automobiles 2 are parking. As the parking lot, in the future, a parking lot dedicated to the automated driving enabled automobile 1 may be provided.

Referring to FIGS. 1A to 1C, the automobile 1 is configured to travel while switching between automated driving and manual driving. The automobile 1 includes an automated driving indicator lamp 5. The automated driving indicator lamp 5 is configured to be switched on, on the occasion of the automated driving.

The automated driving indicator lamp 5 may be a lamp that is switched on, to indicate that the automated driving is in execution. The automated driving indicator lamp 5 may circumscribe a vehicle body 6 of the automobile 1, for example, on all sides, i.e., front, rear, right and left sides, of the vehicle body 6. This makes it possible for those around the automobile 1, e.g., the pedestrian 3 and an occupant of the surrounding automobile 2, to visually recognize, from outside the automobile 1, illumination of the automated driving indicator lamp 5 on the occasion of the execution of the automated driving. Switching on the automated driving indicator lamp 5 on the occasion of the automated driving makes it possible to receive cooperation with the pedestrian 3 near the automobile 1 and the occupant of the surrounding automobile 2. Hence, it is possible to expect a higher level of safety than provided solely by a travel control of the automobile 1 itself.

The automated driving indicator lamp 5 may have other configurations than described above. For example, the automated driving indicator lamp 5 may be provided separately on four corners, i.e., front right, front left, rear right, and rear left corners, of the vehicle body 6. In one alternative, the automated driving indicator lamp 5 may be provided along an outer periphery of a roof panel over a vehicle cabin. In another alternative, the automated driving indicator lamp 5 may protrude from the roof panel.

The automated driving indicator lamp 5 is configured to be switched on, in a case where the automobile 1 is traveling by the automated driving. Moreover, it is desirable that presence or absence of the illumination of the automated driving indicator lamp 5 be perceptible to those outside the automobile 1, e.g., the pedestrian 3 and the occupant of the surrounding automobile 2. Accordingly, the illumination of the automated driving indicator lamp 5 may have a color or brightness that is rare in existence in the natural environment, e.g., turquoise blue. Strong illumination of turquoise blue light leads to higher possibility that the presence or the absence of the illumination of the automated driving indicator lamp 5 becomes more perceptible to those outside the automobile 1, e.g., the pedestrian 3 and the occupant of the surrounding automobile 2. This makes it possible for those outside the automobile 1, e.g., the pedestrian 3 and the occupant of the surrounding automobile 2, to take an action or a prior countermeasure in response to, for example, the automobile 1 executing the automated driving.

On the other hand, keeping the automated driving indicator lamp 5 on during the execution of the automated driving may cause an increase in power consumption of the automated driving enabled automobile 1. In particular, for the electrically powered automobile 1, a steady increase in power consumption during the execution of the automated driving may shorten its cruising range and directly affect its travel performance.

Moreover, selecting the bright color that is rare in existence in the natural environment, e.g., turquoise blue, for the automated driving indicator lamp 5 may cause the possibility that continuous and steady illumination of the automated driving indicator lamp 5 makes those who perceive the illumination feel uncomfortable or incongruous. Those who work at a place with constant presence of the automated driving enabled automobile 1 are forced to keep perceiving bright color light that is rare in existence in the natural environment, e.g., turquoise blue.

As described, the automated driving enabled automobile 1 has had room for improvements.

FIG. 2 illustrates a control system 10 of the automobile 1 in FIGS. 1A to 1C. The control system 10 of the automobile 1 may include a plurality of controllers that are installed in their respective control ECUs (electronic control units). In FIG. 2, each of the plurality of the controllers is typically represented by a corresponding one of the control ECUs. Each of the plurality of the controllers may include not only the control ECU but also a storage member, input and output ports, a timer, and an internal bus to which the control ECU, the storage member, the input and output ports, and the timer are coupled. The storage member may hold, for example, a control program and data. The input and output ports may be coupled to an object to be controlled, and/or to a device that detects a state of the object to be controlled. The timer may measure time and timing.

As illustrated in FIG. 2, in one specific but non-limiting example, the control ECUs may include a driving ECU 11, a steering ECU 12, a braking ECU 13, an automated driving and driver assistance ECU 14, a driving operation ECU 15, a detection ECU 16, an external communication ECU 17, a UI operation ECU 18, a lamp ECU 19, and an alarm ECU 20. The control system 10 of the automobile 1 may further include other undepicted control ECUs.

The plurality of the control ECUs may be coupled to a vehicle network 26 adopted by the automobile 1 such as a CAN (controller area network) and a LIN (local interconnect network). The vehicle network 26 may include a plurality of bus cables 27 and a CGW (central gateway) 28. The plurality of the bus cables 27 is able to be coupled to the plurality of the control ECUs. The central gateway 28 may serve as a relay device to which the plurality of the bus cables 27 is coupled. To the plurality of the control ECUs, their respective IDs (identifications) may be assigned. The IDs may differ from one another and serve as identification information. Each of the control ECU may output, basically on a periodical basis, notification data to one or more of the other control ECUs. To the notification data, the ID of the sender control ECU and the ID of the receiver control ECU may be attached. The other control ECUs than the sender control ECU may monitor the respective ones of the bus cables 27 to which they are coupled. For example, in a case where any one of the other control ECUs finds the ID of the receiver control ECU to match its own ID, the relevant control ECU may acquire the notification data and execute processing based on the notification data. The central gateway 28 may monitor each of the plurality of the bus cables 27 coupled to the central gateway 28. In a case where the central gateway 28 detects one or more of the other control ECUs coupled to any one of the bus cables 27 different from the bus cable 27 to which the sender control ECU is coupled, the central gateway 28 may supply the notification data to the relevant one of the bus cables 27. With such relay processing by the central gateway 28, it is possible for each of the control ECUs to send the notification data to one or more of the other control ECUs coupled to respective ones of the bus cables 27 different from the bus cable 27 to which the sender control ECU is coupled. It is also possible for each of the control ECUs to receive the notification data from any one of the control ECUs coupled to the corresponding one of the bus cables 27 different from the bus cable 27 to which the receiver control ECU is coupled.

The external communication ECU 17 may perform wireless communication with, for example, a communication base station 101 and a communication device of the surrounding automobile 2. The communication base station 101 and the surrounding automobile 2 are present outside the automobile 1. The communication base station 101 may be, for example, a base station of an ADAS (advanced driver assistance system) communication network, or alternatively, the communication base station 101 may be, for example, a base station of a carrier communication network. The base station of the carrier communication network may communicate not only with the communication device of the surrounding automobile 2 but also with a mobile device 102 held by the pedestrian 3. The external communication ECU 17 may be divided into a plurality of subunits for respective categories of partners with whom the external communication ECU 17 communicates directly, and the subunits may be provided in the automobile 1. The communication base station 101, the communication device of the surrounding automobile 2, and the mobile device 102, together with a server apparatus 103, may constitute a traffic system 100. The external communication ECU 17 may transmit and receive communication data to and from the server apparatus 103, the surrounding automobile 2, or the mobile device 102 by directly performing wireless communication with the communication base station 101 or the communication device of the surrounding automobile 2.

To the UI operation ECU 18, a display device 21 and an operation device 22 may be coupled as, for example, a user interface device with an occupant of the automobile 1. The display device 21 may include, for example, a liquid crystal device or a video projection device, or both. The operation device 22 may be, for example, a touchscreen, a keyboard, or a contactless operation sensing device, or any combination thereof. The display device 21 and the operation device 22 may be mounted on, for example, an inner surface of the vehicle cabin in which the occupant rides. The UI operation ECU 18 may acquire the notification data from the vehicle network 26, and display the notification data on the display device 21. The UI operation ECU 18 may output, to the vehicle network 26, an operation input made on the operation device 22. Moreover, the UI operation ECU 18 may perform processing based on the operation input and incorporate a result of the processing in the notification data. The UI operation ECU 18 may provide, for example, display of a navigation screen on the display screen 21. The navigation screen may allow for setting of, for example, a destination. The UI operation ECU 18 may search a path to the destination selected by the operation input. The UI operation ECU 18 may incorporate data regarding the path in the notification data. The data regarding the path may include attribute information regarding, for example, lanes of roads to be used to move from a current position to the destination.

To the driving operation ECU 15, coupled may be operation members that allow the occupant to control the travel of the automobile 1. Specific but non-limiting examples of the operation members may include a steering wheel 31, a brake pedal 32, an accelerator pedal 33, and a shift lever 34. If any operation is made on the operation members, the driving operation ECU 15 may output, to the vehicle network 26, the notification data including, for example, presence or absence of the operation and an amount of the operation. Moreover, the driving operation ECU 15 may execute processing regarding the operation on the operation members, and incorporate a result of the processing in the notification data. For example, if any operation is made on the accelerator pedal 33, with presence of surrounding moving bodies and/or fixed objects in a traveling direction of the automobile 1, the driving operation ECU 15 may make a determination that the operation on the accelerator pedal 33 is an abnormal operation. The driving operation ECU 15 may incorporate the result of the determination in the notification data.

To the detection ECU 16, coupled may be detection members that detect a travel state of the automobile 1. Specific but non-limiting examples of the detection members may include a speed sensor 41, an acceleration sensor 42, an external camera 43, and a GPS receiver 44. The speed sensor 41 may detect a speed of the automobile 1. The acceleration sensor 42 may detect an acceleration rate of the automobile 1. The external camera 43 may capture an image of external surroundings of the automobile 1, and include, for example, a stereo camera. The GPS receiver 44 may serve as a GNSS (global navigation satellite system) receiver that detects a position of the automobile 1. The detection ECU 16 may acquire detection information from the detection members. The detection ECU 16 may output the notification data including the detection information to the vehicle network 26. Furthermore, the detection ECU 16 may execute processing based on the detection information and incorporate a result of the processing in the notification data. For example, in a case where the acceleration sensor 42 detects the acceleration rate being higher than a threshold of detection of a collision, the detection ECU 16 may make a determination that a collision has been detected. The detection ECU 16 may incorporate the result of the determination in the notification data. The detection ECU 16 may extract a moving body such as the pedestrian 3 or the surrounding automobile 2 that are present around the automobile 1, on the basis of the image of the external camera 43. The detection ECU 16 may determine a kind and attributes of the moving body, and make estimation of a relative direction, a relative distance, and a direction of movement of the moving body in accordance with a position, a size, and a change of the moving body in the image. The detection ECU 16 may incorporate information regarding the moving body including a result of the estimation in the notification data and output the notification data to the vehicle network 26.

The automated driving and driver assistance ECU 14 may acquire the notification data from the vehicle network 26 and switch a travel control state of the automobile 1 between the automated driving and the manual driving.

Moreover, the automated driving and driver assistance ECU 14 may acquire the notification data from the vehicle network 26, execute a control for the automated driving or driver assistance of the automobile 1, and generate travel control data to output the travel control data to the driving ECU 11, the steering ECU 12, and the braking ECU 13. The driving ECU 11, the steering ECU 12, and the braking ECU 13 may control the travel of the automobile 1 on the basis of the travel control data to be supplied.

In one embodiment of the technology, the automated driving and driver assistance ECU 14 may serve as a "travel controller".

In one specific but non-limiting example, in performing the automated driving of the automobile 1, the automated driving and driver assistance ECU 14 may acquire the notification data from the vehicle network 26 and search or acquire the path to the destination. The automated driving and driver assistance ECU 14 may acquire the notification data from the vehicle network 26, determine presence or absence of an abnormality or uncertainties in the automobile 1. In a case without any abnormality or uncertainties in the automobile 1, the automated driving and driver assistance ECU 14 may generate the travel control data regarding a course to be traveled along the path, and output the generated travel control data as the notification data. The automated driving and driver assistance ECU 14 may control the travel of the automobile 1 on the basis of positional information of the automobile 1 from, for example, the GPS receiver 44, to allow the automobile 1 to travel along the path of its movement until an arrival at the destination, i.e., until the automobile 1 stops, for example, in a parking lot at the destination. In a case with an abnormality or uncertainties with respect to the automobile 1, the automated driving and driver assistance ECU 14 may generate the travel control data to avoid the abnormality or the uncertainties, and output the generated travel control data as the notification data.

In assisting with driving of the automobile 1, the automated driving and driver assistance ECU 14 may acquire the notification data regarding the operation input from the UI operation ECU 18 through the vehicle network 26. The automated driving and driver assistance ECU 14 may generate the travel control data in which an operation based on the operation input is adjusted, and output the travel control data as the notification data. The automated driving and driver assistance ECU 14 may control the travel of the automobile 1 in accordance with a driving operation by the occupant. In a case with an abnormality or uncertainties with respect to the automobile 1, the automated driving and driver assistance ECU 14 may generate the travel control data to avoid the abnormality or the uncertainties, and output the generated travel control data as the notification data.

To the lamp ECU 19, coupled may be head lamps 51, turn signal lamps 52, stop lamps 53, and the automated driving indicator lamp 5. The head lamps 51 may be provided in a front part of the vehicle body 6 of the automobile 1. The turn signal lamps 52 may be provided on front right, front rear, rear right, and rear left corners of the vehicle body 6. The stop lamps 53 may be provided in a rear part of the vehicle body 6. Moreover, as illustrated in the figure, a memory 59 may be coupled to the lamp ECU 19. The memory 59 coupled to the lamp ECU 19 may hold setting values the lamp ECU 19 uses for a control.

In one embodiment of the technology, the lamp ECU 19 may serve as a "lamp controller".

In one specific but non-limiting example, the lamp ECU 19 may acquire, from the vehicle network 26, the notification data for a lamp control. In accordance with the notification data acquired, the lamp ECU 19 may control lighting states of the head lamps 51, the turn signal lamps 52, the stop lamps 53, and the automated driving indicator lamp 5. For example, in a case where the automated driving and driver assistance ECU 14 is controlling the travel of the automobile 1 by the automated driving, the lamp ECU 19 may switch on the automated driving indicator lamp 5 during the execution of the automated driving. This makes it possible for the moving body outside the automobile 1, e.g., the pedestrian 3 and the surrounding automobile 2, to visually recognize, with the clue of the illumination of the automated driving indicator lamp 5, that the automobile 1 is executing the automated driving. Hence, it is possible for the moving body outside the automobile 1, e.g., the pedestrian 3 and the surrounding automobile 2, to cope with the travel of the automobile 1 executing the automated driving. The lamp ECU 19 may perform a lighting control to switch off the automated driving indicator lamp 5, in a case where, for example, travel environment of the automobile 1 renders it unnecessary to switch on the automated driving indicator lamp 5 regardless of the execution of the automated driving.

To the alarm ECU 20, an external speaker 61 may be coupled. The alarm ECU 20 may acquire the notification data regarding an alarm output from the vehicle network 26 and output an alarm sound from the external speaker 61 in response to the notification data thus acquired.

Figure 3:
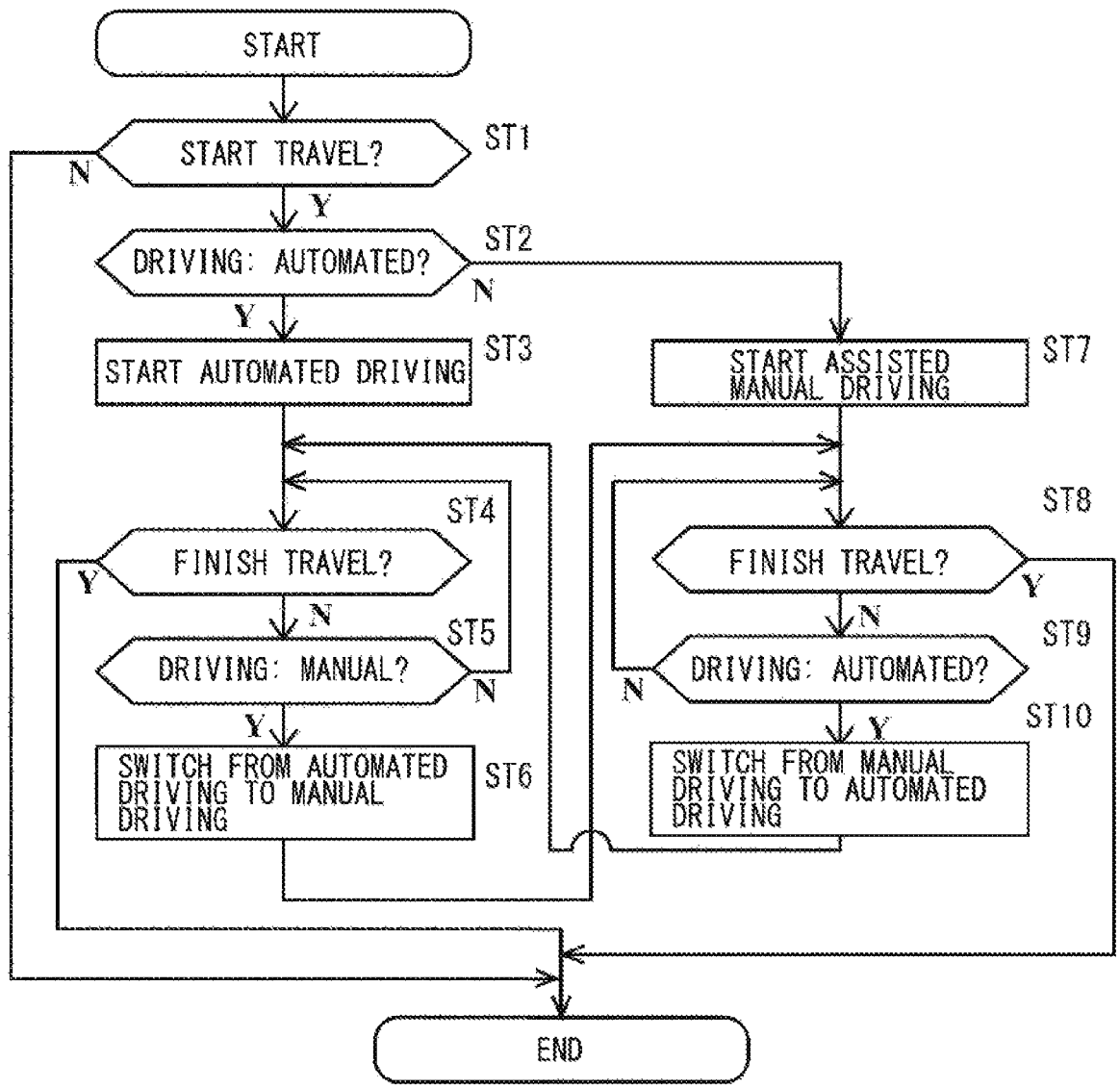
FIG. 3 is a flowchart of a switching control between automated driving and assisted manual driving.

FIG. 3 is a flowchart of a switching control between the automated driving and assisted manual driving. The automated driving and driver assistance ECU 14 may repeatedly execute processing of FIG. 3 in a case where, for example, the occupant rides in the automobile 1.

In step ST1, the automated driving and driver assistance ECU 14 may determine whether or not to start the travel of the automobile 1. In a case where the travel of the automobile 1 is not going to be started (N in step ST1), the automated driving and driver assistance ECU 14 may terminate the processing of FIG. 3. In a case where the travel of the automobile 1 is going to be started (Y in step ST1), the automated driving and driver assistance ECU 14 may cause the processing to proceed to step ST2.

In step ST2, the automated driving and driver assistance ECU 14 may determine whether or not the travel of the automobile 1 is controlled by the automated driving. The automated driving and driver assistance ECU 14 may determine whether or not the travel of the automobile 1 is controlled by the automated driving on the basis of, for example, a setting value of a driving mode acquired from the UI operation ECU 18. In a case where the travel of the automobile 1 is controlled by the automated driving (Y in step ST2), the automated driving and driver assistance ECU 14 may cause the processing to proceed to step ST3. In a case where the travel of the automobile 1 is not controlled by the automated driving but is otherwise controlled, e.g., by the assisted manual driving (N in step ST2), the automated driving and driver assistance ECU 14 may cause the processing to proceed to step ST7.

In step ST3, the automated driving and driver assistance ECU 14 may start the travel by the automated driving. The automated driving and driver assistance ECU 14 may control the travel of the automobile 1 by the automated driving.

In step ST4, the automated driving and driver assistance ECU 14 may determine whether or not to finish the travel of the automobile 1. The automated driving and driver assistance ECU 14 may determine that the travel of the automobile 1 is going to be finished, in a case where the positional information of the automobile 1 indicates that the automobile 1 is stopped, for example, in a parking lot at the destination of the automated driving, with the acceleration rate being zero (0). The positional information of the automobile 1 may be acquired from the external communication ECU 17 or the GPS receiver 44. In a case where the automated driving and driver assistance ECU 14 determines that the travel of the automobile 1 is going to be finished (Y in step ST4), the automated driving and driver assistance ECU 14 may terminate the processing of FIG. 3. Thus, the travel by the automated driving is finished. In a case where the automated driving and driver assistance ECU 14 does not determine that the travel of the automobile 1 is going to be finished (N in step ST4), the automated driving and driver assistance ECU 14 may cause the processing to proceed to step ST5.

In step ST5, the automated driving and driver assistance ECU 14 may determine whether or not to switch the travel of the automobile 1 from the automated driving to otherwise than the automated driving, e.g., the manual driving. The automated driving and driver assistance ECU 14 may determine that the travel of the automobile 1 is going to be switched from the automated driving, on the basis of, for example, the setting value of the driving mode acquired from the UI operation ECU 18. In a case where the travel of the automobile 1 is not going to be switched from the automated driving to otherwise than the automated driving (N in step ST5), the automated driving and driver assistance ECU 14 may cause the processing to return to step ST4. The automated driving and driver assistance ECU 14 may repeat the determinations of steps ST4 and ST5 while the automated driving is in execution. In a case where the travel of the automobile 1 is going to be switched from the automated driving to otherwise than the automated driving (Y in step ST5), the automated driving and driver assistance ECU 14 may cause the processing to proceed to step ST6.

In step ST6, the automated driving and driver assistance ECU 14 may switch the travel of the automobile 1 from the automated driving to otherwise than the automated driving, e.g., the assisted manual driving. Thus, the travel by the automated driving is finished, and the travel by the manual driving is started. Thereafter, the automated driving and driver assistance ECU 14 may cause the processing to proceed to step ST8.

In step ST7, the automated driving and driver assistance ECU 14 may start the assisted manual driving or otherwise than the automated driving.

In step ST8, the automated driving and driver assistance ECU 14 may determine whether or not to finish the travel of the automobile 1. For example, the automated driving and driver assistance ECU 14 may determine that the travel of the automobile 1 is going to be finished, in a case where the automobile 1 is stopped, with the acceleration rate being zero (0), and an operation is made on an ignition switch of the automobile 1. In a case with a determination that the travel of the automobile 1 is going to be finished (Y in step ST8), the automated driving and driver assistance ECU 14 may terminate the processing of FIG. 3. Thus, the travel by the assisted manual driving is finished. In a case without the determination that the travel of the automobile 1 is going to be finished (N in step ST8), the automated driving and driver assistance ECU 14 may cause the processing to proceed to step ST9.

In step ST9, the automated driving and driver assistance ECU 14 may determine whether or not to switch the travel of the automobile 1 from the assisted manual driving to the automated driving. The automated driving and driver assistance ECU 14 may determine that the travel of the automobile 1 is going to be switched from the assisted manual driving, on the basis of, for example, the setting value of the driving mode acquired from the UI operation ECU 18. In a case where the travel of the automobile 1 is not going to be switched from the assisted manual driving to the automated driving (N in step ST9), the automated driving and driver assistance ECU 14 may cause the processing to return to step ST8. The automated driving and driver assistance ECU 14 may repeat the determinations of steps ST8 and ST9 while the assisted manual driving is in execution. In a case where the travel of the automobile 1 is going to be switched from the assisted manual driving to the automated driving (Y in step ST9), the automated driving and driver assistance ECU 14 may cause the processing to proceed step ST10.

In step ST10, the automated driving and driver assistance ECU 14 may switch the travel of the automobile 1 from the assisted manual driving to the automated driving. Thus, the travel by the assisted manual driving is finished, and the travel by the automated driving is started. Thereafter, the automated driving and driver assistance ECU 14 may cause the processing to proceed to step ST4.

As described, the automated driving and driver assistance ECU 14 may repeatedly execute the processing of FIG. 3, in a case where, for example, the automobile 1 is traveling, with the occupant riding therein. For example, the automated driving and driver assistance ECU 14 may acquire, through the vehicle network 26, the notification data inclusive of setting information of the driving mode from the UI operation ECU 18, and switch the travel of the automobile 1 between the automated driving and the assisted manual driving. Moreover, the automated driving and driver assistance ECU 14 may acquire the notification data inclusive of an instruction to compulsively switch to the manual driving, and switch the travel of the automobile 1 between the automated driving and the assisted manual driving. Such an instruction may be based on, for example, detection of an abnormality from the detection ECU 16. Furthermore, the automated driving and driver assistance ECU 14 itself may generate the notification data inclusive of the instruction based on the detection of an abnormality, to compulsively switch to the manual driving, and switch the travel of the automobile 1 between the automated driving and the assisted manual driving.

Figure 4:
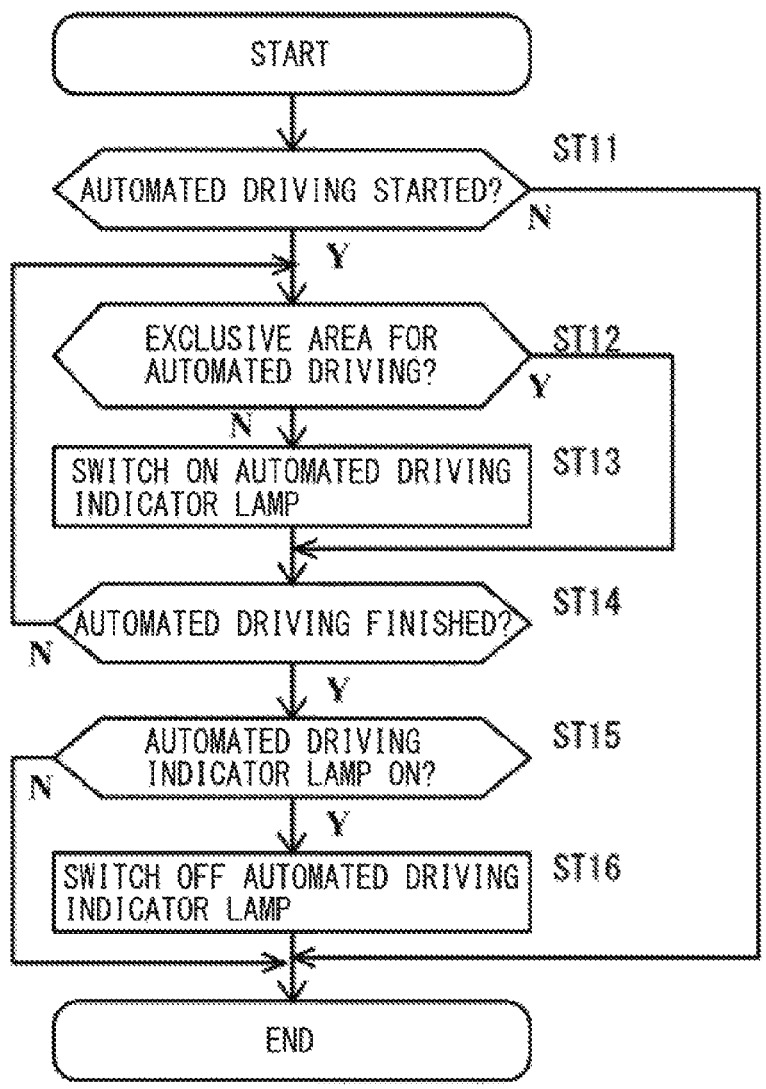
FIG. 4 is a flowchart of a lighting control of an automated driving indicator lamp in accordance with the switching control between the automated driving and the assisted manual driving illustrated in FIG. 3.

FIG. 4 is a flowchart of the lighting control of the automated driving indicator lamp 5 in accordance with the switching control between the automated driving and the assisted manual driving illustrated in FIG. 3.

The lamp ECU 19 may repeatedly execute processing of FIG. 4, while keeping on acquiring, as the notification data, information from the automated driving and driver assistance ECU 14 controlling the travel of the automobile 1.

In step ST11, the lamp ECU 19 may determine whether or not the travel of the automobile 1 by the automated driving has been started. The lamp ECU 19 may acquire, for example, information and/or notification the automated driving and driver assistance ECU 14 outputs to the vehicle network 26 for a control of the automated driving, and determine whether or not the travel of the automobile 1 by the automated driving has been started. In a case where the travel of the automobile 1 by the automated driving has not been started (N in step ST11), the lamp ECU 19 may terminate the processing of FIG. 4. In a case where the travel of the automobile 1 by the automated driving has been started (Y in step ST11), the lamp ECU 19 may cause the processing to proceed to step ST12.

In step ST12, the lamp ECU 19 may determine whether or not the place being traveled by the automobile 1 is an exclusive area for the automated driving. The exclusive area for the automated driving may include, for example, a parking lot exclusive for autonomous cars. In addition, for example, the exclusive area for the automated driving may be a place that assumes solely entry of autonomous cars. In a case where the automobile 1 is not traveling in the exclusive area for the automated driving (N in step ST12), the lamp ECU 19 may cause the processing to step ST13. In a case where the automobile 1 is traveling in the exclusive area for the automated driving (Y in step ST12), the lamp ECU 19 may cause the processing to skip step ST13 to proceed to step ST14.

The parking lot exclusive for the autonomous cars basically does not assume any entry of pedestrians, automobiles that are not able to perform the automated driving, and automobiles that are not executing the automated driving. In this case, the external communication ECU 17 may acquire, from the server apparatus 103, information regarding the place being traveled by the automobile 1. Such information may be included in navigation information and ETC (electronic toll collection system) information. On the basis of the information thus acquired, the external communication ECU 17 or the lamp ECU 19 may determine whether or not the place being traveled by the automobile 1 is the parking lot exclusive for the autonomous cars. In addition, for example, the external communication ECU 17 may acquire these pieces of information by, for example, inter-vehicle communication. Moreover, the detection ECU 16 may allow the external camera 43 to capture an image of the place being traveled by the automobile 1. The detection ECU 16 or the lamp ECU 19 may detect, from the contents of the captured image, a road surface mark, a sign, and gates of an entrance and an exit of the parking lot, to determine whether or not the place being traveled by the automobile 1 is the parking lot exclusive for the autonomous cars.

In step ST13, the lamp ECU 19 may switch on the automated driving indicator lamp 5. Thus, the automated driving indicator lamp 5 is switched on at a start of the travel of the automobile 1 by the automated driving in other places than the exclusive area for the automated driving.

In step ST14, the lamp ECU 19 may determine whether or not the travel of the automobile 1 by the automated driving has been finished. For example, the lamp ECU 19 may determine whether or not the travel of the automobile 1 by the automated driving has been finished, on the basis of an end of acquisition of the information supplied to the vehicle network 26 from the automated driving and driver assistance ECU 14 for the control of the automated driving. Alternatively, the lamp ECU 19 may determine whether or not the travel of the automobile 1 by the automated driving has been finished, by acquiring notification that the automated driving has been finished. In a case where the travel of the automobile 1 by the automated driving has not been finished (N in step ST14), the lamp ECU 19 may cause the processing to return to step ST12. In a case where the travel of the automobile 1 by the automated driving has been finished (Y in step ST14), the lamp ECU 19 may cause the processing to proceed to step ST15.

In step ST15, the lamp ECU 19 may determine whether or not the automated driving indicator lamp 5 is on. In a case where the automated driving indicator lamp 5 is on (Y in step ST15), the lamp ECU 19 may cause the processing to proceed to step ST16. In a case where the automated driving indicator lamp 5 is not on (N in step ST15), the lamp ECU 19 may cause the processing to skip the process of step ST16 and terminate the processing of FIG. 4.

In step ST16, the lamp ECU 19 may switch off the automated driving indicator lamp 5 that has been on.

As described, the lamp ECU 19 may basically switch on the automated driving indicator lamp 5 during the execution of the automated driving in which the automated driving and driver assistance ECU 14 controls the travel of the automobile 1 by the automated driving.

Figure 5:
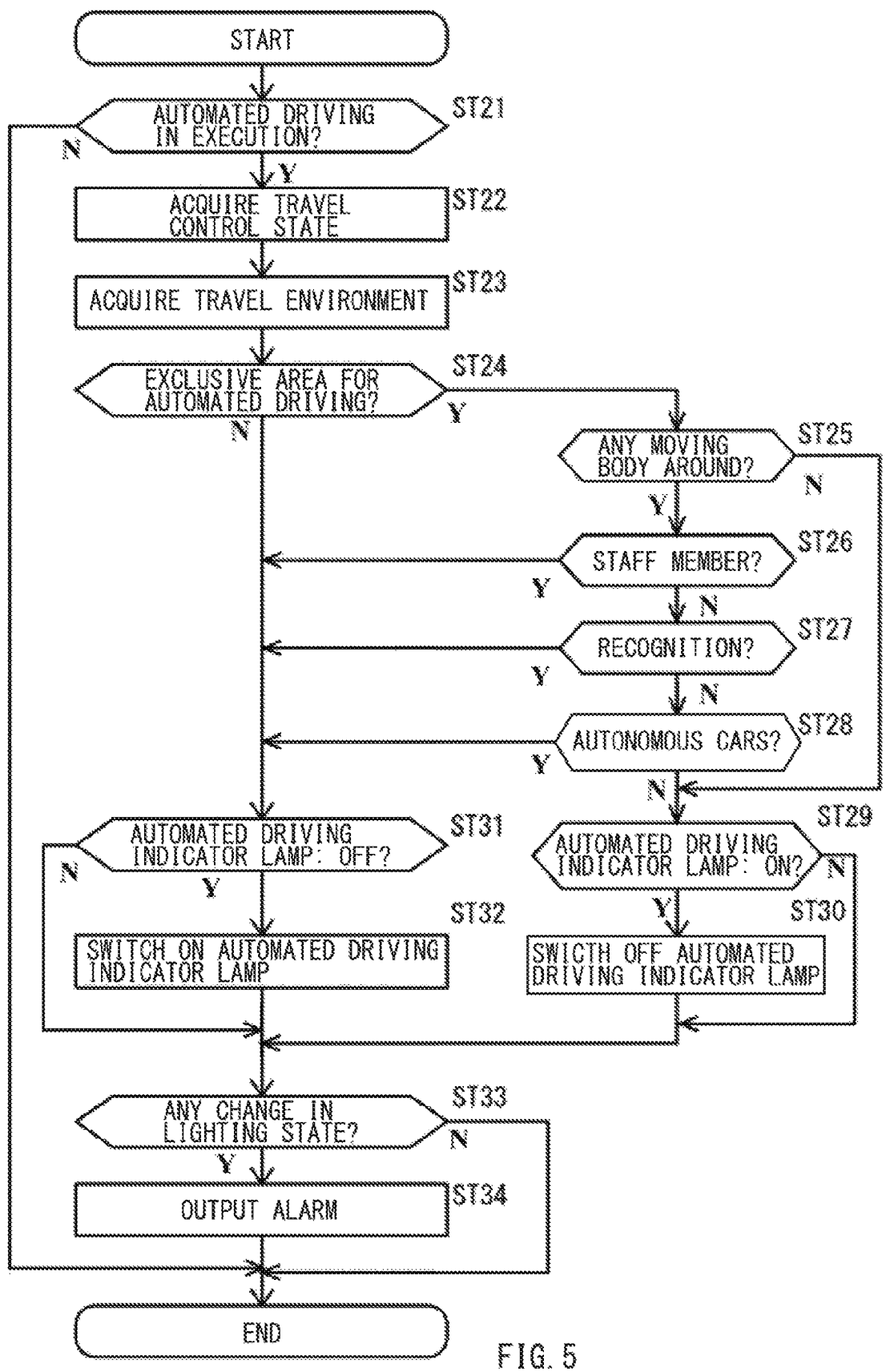
FIG. 5 is a flowchart of a lighting state control of the automated driving indicator lamp during execution of the automated driving according to the embodiment of the technology.

FIG. 5 is a flowchart of a lighting state control of the automated driving indicator lamp 5 during the execution of the automated driving according to the embodiment of the technology.

The lamp ECU 19 may repeatedly execute processing of FIG. 5, while keeping on acquiring, as the notification data, the information from the automated driving and driver assistance ECU 14 controlling the travel of the automobile 1 by, for example, the automated driving.

In one embodiment of the technology, the lamp ECU 19 may serve as the "lamp controller".

In step ST21, the lamp ECU 19 may determine whether or not the automated driving is in execution. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automated driving is not in execution (N in step ST21), the lamp ECU 19 may terminate the processing of FIG. 5. In a case where the automated driving is in execution (Y in step ST21), the lamp ECU 19 may cause the processing to proceed to step ST22.

In step ST22, the lamp ECU 19 may acquire information regarding the travel control state of the automobile 1, as the notification data, from the various control ECUs of the automobile 1 through the vehicle network 26. The lamp ECU 19 may acquire, for example, information regarding the position, the speed, the acceleration rate, the course, presence or absence of a failure, and lighting states of various lamps, as to the automobile 1.

In step ST23, the lamp ECU 19 may acquire information regarding the travel environment, as the notification data, from the various control ECUs of the automobile 1 such as the external communication ECU 17 and the detection ECU 16 through the vehicle network 26.

The lamp ECU 19 may acquire, for example, attribute information regarding the place being traveled by the automobile 1. The information regarding the place may include information as to whether or not the place is the exclusive area for the automated driving. Specific but non-limiting examples of the exclusive area for the automated driving may include the parking lot exclusive for the autonomous cars. The external communication ECU 17 is configured to acquire the attribute information regarding the place being traveled, on the basis of the navigation information, V2V (virtual to virtual) received information, and the ETC information by the ADAS communication. The detection ECU 16 is configured to detect the place being traveled, by the image captured by the external camera 43. Moreover, the detection ECU 16 is configured to detect whether or not the place being traveled by the automobile 1 is the parking lot exclusive for the autonomous cars, by the road surface mark, the sign, and the gates of the entrance and the exit of the parking lot exclusive for the autonomous cars that are captured in the image.

In addition, for example, the lamp ECU 19 may further acquire information regarding a position, a speed, a predicted course, possibility of a collision, and attributes of a surrounding moving body present around the automobile 1. The external communication ECU 17 is configured to acquire the information regarding the surrounding moving body present around the automobile 1, on the basis of the navigation information, the V2V received information, and the ETC information by the ADAS communication. The detection ECU 16 is configured to detect the surrounding moving body present around the automobile 1, by the image captured by the external camera 43, to determine the attributes of the surrounding moving body. Moreover, the detection ECU 16 is configured to detect the surrounding moving body present around the automobile 1 by an undepicted Lidar (light detection and ranging) or laser, to determine the attributes of the surrounding moving body thus detected.

In step ST24, the lamp ECU 19 may determine whether or not a traveling position of the automobile 1 is in the exclusive area for the automated driving. In a case where the automobile 1 is traveling in the exclusive area for the automated driving (Y in step ST24), the lamp ECU 19 may cause the processing to proceed to step ST25. In a case where the automobile 1 is not traveling in the exclusive area for the automated driving (N in step ST24), the lamp ECU 19 may cause the processing to proceed to step ST31.

In step ST25, the lamp ECU 19 may determine presence or absence of a moving body around the automobile 1, e.g., a surrounding vehicle and a pedestrian. In a case with the presence of a surrounding moving body around the automobile 1 (Y in step ST25), the lamp ECU 19 may cause the processing to proceed to step ST26. In a case with the absence of a surrounding moving body around the automobile 1 (N in step ST25), the lamp ECU 19 may cause the processing to proceed to step ST29.

In step ST26, the lamp ECU 19 may determine whether or not the surrounding moving body present around the automobile 1 is a staff member who belongs to the exclusive area for the automated driving. The lamp ECU 19 may further determine whether or not the surrounding moving body present around the automobile 1 is a vehicle that belongs to the exclusive area for the automated driving. In a case where the surrounding moving body present around the automobile 1 is a staff member (Y in step ST26), the lamp ECU 19 may cause the processing to proceed to step ST31. In a case where the surrounding moving body present around the automobile 1 is something other than a staff member (N in step ST26), the lamp ECU 19 may cause the processing to proceed to step ST27.

In step ST27, the lamp ECU 19 may determine whether or not the surrounding moving body present around the automobile 1 has a recognition of the presence of the vehicle. The lamp ECU 19 may determine that the surrounding moving body has the recognition of the presence of the vehicle, in a case where, for example, the head of the pedestrian is directed toward the automobile 1 in the image captured by the external camera 43. In a case where the lamp ECU 19 determines that the surrounding moving body has the recognition of the presence of the vehicle (Y in step ST27), the lamp ECU 19 may cause the processing to proceed to step ST31. In a case where the lamp ECU 19 determines that the surrounding moving body lacks the recognition of the presence of the vehicle (N in step ST27), the lamp ECU 19 may cause the processing to proceed to step ST28.

In step ST28, the lamp ECU 19 may determine whether or not all the surrounding automobiles present around the automobile 1 are autonomous cars. In a case where all the surrounding automobiles present around the automobile 1 are autonomous cars (Y in step ST28), the lamp ECU 19 may cause the processing to proceed to step ST31. In a case where some of the surrounding automobiles present around the automobile 1 are automobiles other than autonomous cars (N in step ST28), the lamp ECU 19 may cause the processing to proceed to step ST29.

In step ST29, the lamp ECU 19 may determine whether or not the automated driving indicator lamp 5 is on. In a case where the automated driving indicator lamp 5 is on (Y in step ST29), the lamp ECU 19 may cause the processing to proceed to step ST30. In a case where the automated driving indicator lamp 5 is not on (N in step ST29), the lamp ECU 19 may cause the processing to proceed to step ST33.

In step ST30, the lamp ECU 19 may switch off the automated driving indicator lamp 5 that has been on. Thereafter, the lamp ECU 19 may cause the processing to proceed to step ST33.

In step ST31, the lamp ECU 19 may determine whether or not the automated driving indicator lamp 5 is off. In a case where the automated driving indicator lamp 5 is off (Y in step ST31), the lamp ECU 19 may cause the processing to proceed to step ST32. In a case where the automated driving indicator lamp 5 is not off, i.e., in a case where the automated driving indicator lamp 5 is on (N in step ST31), the lamp ECU 19 may cause the processing to proceed to step ST33.

In step ST32, the lamp ECU 19 may switch on the automated driving indicator lamp 5 that has been off. Thereafter, the lamp ECU 19 may cause the processing to proceed to step ST33.

In step ST33, the lamp ECU 19 may determine if there has been any change in a lighting state of the automated driving indicator lamp 5. The lamp ECU 19 may determine that there has been a change in the lighting state of the automated driving indicator lamp 5, in a case where the automated driving indicator lamp 5 that has been on is switched off, or in a case where the automated driving indicator lamp 5 is switched back on that has been off. In a case with the change in the lighting state of the automated driving indicator lamp 5 (Y in step ST33), the lamp ECU 19 may cause the processing to proceed to step ST34. In a case without the change in the lighting state of the automated driving indicator lamp 5 (N in step ST33), the lamp ECU 19 may terminate the processing of FIG. 5.

In step ST34, the lamp ECU 19 may output, to the vehicle network 26, an instruction to output an alarm. The alarm ECU 20 may acquire, from the vehicle network 26, the instruction to output the alarm. Thereupon, the alarm ECU 20 may output an alarm sound from the external speaker 61. The alarm ECU 20 may output the alarm, in the case with the change in the lighting state of the automated driving indicator lamp 5 during the execution of the automated driving in which the automated driving and driver assistance ECU 14 controls the travel of the automobile 1 by the automated driving. Those around the automobile 1, e.g., the occupant of the nearby surrounding automobile 2, can hear the alarm sound.

As described, the lamp ECU 19 is configured to change the lighting state of the automated driving indicator lamp 5 during the execution of the automated driving, in response to the change in the travel control state or the change in the travel environment, or both. The lamp ECU 19 may switch off the automated driving indicator lamp 5 during the execution of the automated driving, in the case where the travel environment renders it unnecessary to switch on the automated driving indicator lamp 5 regardless of the execution of the automated driving. Non-limiting examples of such travel environment may include the exclusive place for the automated driving. In addition, the lamp ECU 19 may switch the automated driving indicator lamp 5 back on that has been off during the execution of the automated driving, in the case where the automobile 1 executing the automated driving has left the exclusive area for the automated driving and is traveling.

Moreover, the lamp ECU 19 may switch the automated driving indicator lamp 5 back on that has been off during the execution of the automated driving, in the case with the presence of the surrounding moving body around the automobile 1 regardless of the execution of the automated driving in the exclusive place for the automated driving. The lamp ECU 19 is configured to switch the automated driving indicator lamp 5 back on that has been off during the execution of the automated driving in the exclusive place for the automated driving, in accordance with the attributes of the surrounding moving body present around the automobile 1. Furthermore, the alarm ECU 20 may output the alarm in the case with the change in the lighting state of the automated driving indicator lamp 5 during the execution of the automated driving.

Figure 6:
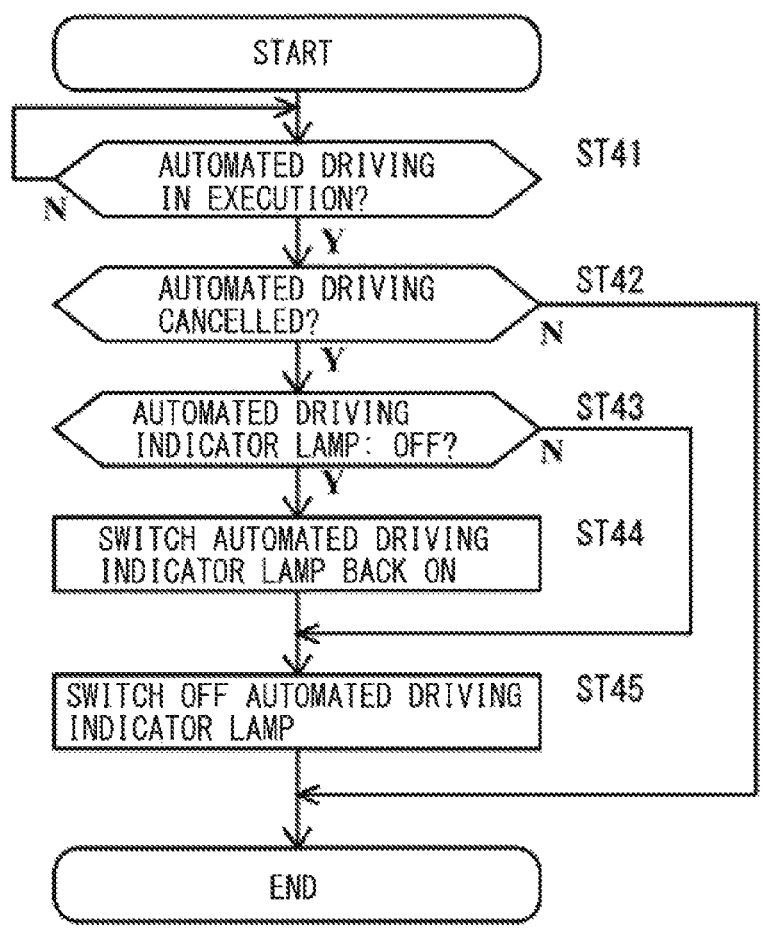
FIG. 6 is a flowchart of the lighting state control of the automated driving indicator lamp, in a case where the automated driving is cancelled.

FIG. 6 is a flowchart of the lighting state control of the automated driving indicator lamp 5, in a case where the automated driving is cancelled.

The lamp ECU 19 may repeatedly execute processing of FIG. 6, while keeping on acquiring, as the notification data, the information from the automated driving and driver assistance ECU 14 controlling the travel of the automobile 1 by, for example, the automated driving.

In one embodiment of the technology, the lamp ECU 19 may serve as the "lamp controller".

In step ST41, the lamp ECU 19 may determine whether or not the automated driving is in execution. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automated driving is not in execution (N in step ST41), the lamp ECU 19 may repeat the determination process of step ST41. In a case where the automated driving is in execution (Y in step ST41), the lamp ECU 19 may cause the processing to proceed to step ST42.

In step ST42, the lamp ECU 19 may determine whether or not the automated driving has been canceled after a start of the automated driving. The lamp ECU 19 may acquire, for example, the information and/or the notification the automated driving and driver assistance ECU 14 outputs to the vehicle network 26 for the control of the automated driving, and determine whether or not the automated driving has been canceled. In a case where the automated driving has not been canceled (N in step ST42), the lamp ECU 19 may terminate the processing of FIG. 6. In a case where the automated driving has been canceled (Y in step ST42), the lamp ECU 19 may cause the processing to proceed to step ST43.

In step ST43, the lamp ECU 19 may acquire information regarding the lighting state of the automated driving indicator lamp 5, and determine whether or not the automated driving indicator lamp 5 is off during the execution of the automated driving. In a case where the automated driving indicator lamp 5 is not off, i.e., in a case where the automated driving indicator lamp 5 is on during the execution of the automated driving (N in step ST43), the lamp ECU 19 may cause the processing to proceed to step ST45. In a case where the automated driving indicator lamp 5 is off during the execution of the automated driving (Y in step ST43), the lamp ECU 19 may cause the processing to proceed to step ST44.

In step ST44, the lamp ECU 19 may switch the automated driving indicator lamp 5 back on that has been off during the execution of the automated driving.

In step ST45, the lamp ECU 19 may switch off the automated driving indicator lamp 5 that has been temporarily switched back on or that has been on.

As described, the lamp ECU 19 may switch the automated driving indicator lamp 5 back on, and afterwards, switch off the automated driving indicator lamp 5, in the case where the automated driving and driver assistance ECU 14 switches the travel control state of the automobile 1 from the automated driving to, for example, the assisted manual driving, during the execution of the automated driving, with the automated driving indicator lamp 5 off. In a case with an override from the automated driving to the manual driving during the execution of the automated driving, with the automated driving indicator lamp 5 off, the lamp ECU 19 may switch the automated driving indicator lamp 5 back on, and afterwards, switch off the automated driving indicator lamp 5, even if the automobile 1 is traveling in the exclusive area for the automated driving. Switching the automated driving indicator lamp 5 back on makes it possible for those present in the exclusive area for the automated driving, e.g., the surrounding automobile 2, its occupant, and the pedestrian 3, to recognize a change in a driving state of the automobile 1.

Figure 7:
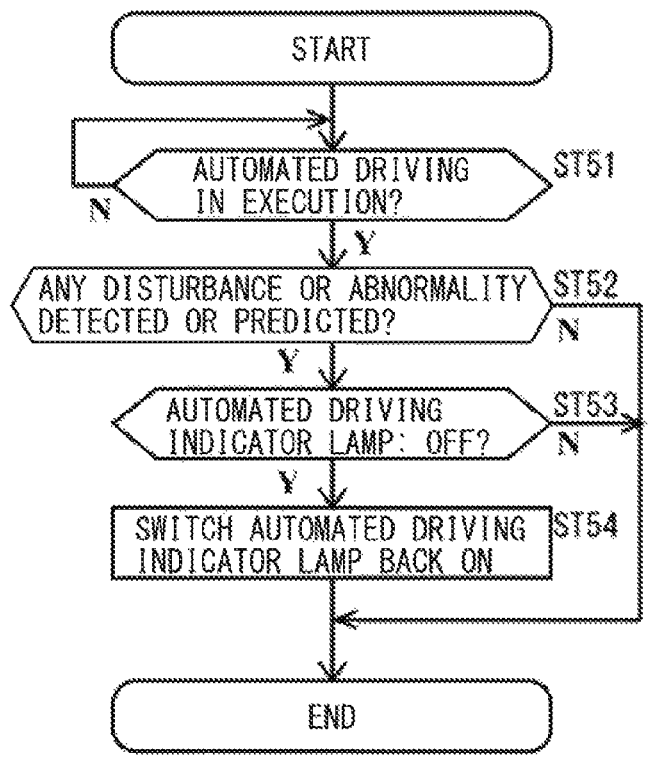
FIG. 7 is a flowchart of the lighting state control of the automated driving indicator lamp, in a case where a disturbance or an abnormality is detected or predicted during the execution of the automated driving.

FIG. 7 is a flowchart of the lighting state control of the automated driving indicator lamp 5, in a case where a disturbance or an abnormality is detected or predicted during the execution of the automated driving.

The lamp ECU 19 may repeatedly execute processing of FIG. 7, while keeping on acquiring the notification data from the automated driving and driver assistance ECU 14 controlling the travel of the automobile 1 by, for example, the automated driving.

In one embodiment of the technology, the lamp ECU 19 may serve as the "lamp controller".

For example, the detection ECU 16 may predict a collision with a nearby moving body captured by the external camera 43, detect the collision by the acceleration sensor 42, and output them as the notification data. The external communication ECU 17 may acquire information regarding, for example, a traffic congestion and a falling object on the lane or the road being traveled by the automobile 1, on the basis of, for example, traffic information by the ADAS communication. The external communication ECU 17 may output the acquired information as the notification data. The automated driving and driver assistance ECU 14 may determine a failure state of equipment of the automobile 1, and output a determination result as the notification data.

In step ST51, the lamp ECU 19 may determine whether or not the automated driving is in execution. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automated driving is not in execution (N in step ST51), the lamp ECU 19 may repeat the determination process of step ST51. In a case where the automated driving is in execution (Y in step ST51), the lamp ECU 19 may cause the processing to proceed to step ST52.

In step ST52, the lamp ECU 19 may determine whether or not any disturbance or abnormality has been detected or predicted after the start of the automated driving. The lamp ECU 19 may acquire the notification from, for example, the automated driving and driver assistance ECU 14, and determine presence or absence of any disturbance or abnormality after the start of the automated driving. In a case with no disturbance nor abnormality after the start of the automated driving (N in step ST52), the lamp ECU 19 may terminate the processing of FIG. 7. In a case with some disturbance or abnormality after the start of the automated driving (Y in step ST52), the lamp ECU 19 may cause the processing to proceed to step ST53.

In step ST53, the lamp ECU 19 may acquire the information regarding the lighting state of the automated driving indicator lamp 5 and determine whether or not the automated driving indicator lamp 5 is off during the execution of the automated driving. In a case where the automated driving indicator lamp 5 is not off, that is, in a case where the automated driving indicator lamp 5 is on during the execution of the automated driving (N in step ST53), the lamp ECU 19 may terminate the processing of FIG. 7. In a case where the automated driving indicator lamp 5 is off during the execution of the automated driving (Y in step ST53), the lamp ECU 19 may cause the processing to proceed to step ST54.

In step ST54, the lamp ECU 19 may switch the automated driving indicator lamp 5 back on that has been off during the execution of the automated driving.

As described, in the case with some disturbance or abnormality after switching off the automated driving indicator lamp 5 during the execution of the automated driving, the lamp ECU 19 may switch the automated driving indicator lamp 5 back on that has been off during the execution of the automated driving. The lamp ECU 19 may switch the automated driving indicator lamp 5 back on that has been off during the execution of the automated driving, in the case where any abnormality or disturbance affecting the travel of the automobile 1 is detected or predicted, with the automated driving indicator lamp 5 off during the execution of the automated driving. Switching the automated driving indicator lamp 5 back on makes it possible for, without limitation, a subsequent vehicle on, for example, the exclusive lane for the automated driving to recognize that some change, including an abnormal situation, has occurred in the automobile 1 executing the automated driving.

Figure 8:
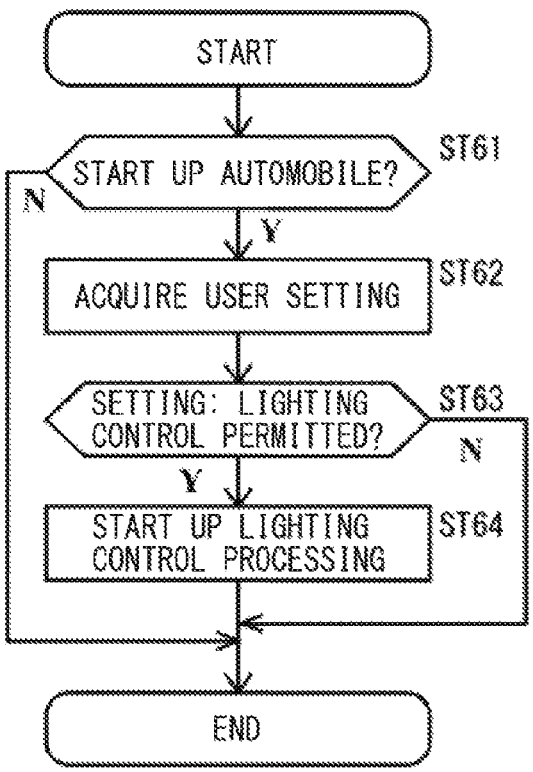
FIG. 8 is a flowchart of start-up, in accordance with user setting, of the lighting state control of the automated driving indicator lamp during the execution of the automated driving.

FIG. 8 is a flowchart of start-up, in accordance with user setting, of the lighting state control of the automated driving indicator lamp 5 during the execution of the automated driving.

The lamp ECU 19 may repeatedly execute processing of FIG. 8, for example, at start-up of the automobile 1, with the occupant getting into the automobile 1. The lamp ECU 19 may repeatedly execute the processing of FIG. 8, for example, on acquiring, from the UI operation ECU 18, the notification data regarding an instruction to start up in response to an operation on an undepicted start switch provided on the automobile 1.

In step ST61, the lamp ECU 19 may determine whether or not to start up the automobile 1. In a case where the automobile 1 is not going to be started up (N in step ST61), the lamp ECU 19 may terminate the processing of FIG. 8. In a case where the automobile 1 is going to be started up (Y in step ST61), the lamp ECU 19 may cause the processing to proceed to step ST62.

In step ST62, the lamp ECU 19 may acquire a user setting value from the memory 59 coupled to the lamp ECU 19. The user setting value may be held in the memory 59. The user setting value may include a setting value of lamp lighting acquired from the UI operation ECU 18 by the user's setting operation in advance. The user setting value may further include a setting value as to whether or not to permit the lighting control of the automated driving indicator lamp 5 during the execution of the automated driving. A default setting value may be a value that permits the lighting control, or alternatively, the default setting value may be a value that inhibits the lighting control.

In step ST63, the lamp ECU 19 may determine whether or not the user setting value thus acquired permits the lighting control. The user setting value may be the setting value as to whether or not to permit the lighting control of the automated driving indicator lamp 5. In a case where the user setting value is a value that does not permit the lighting control, i.e., in a case where the user setting value is the value that inhibits the lighting control (N in step ST63), the lamp ECU 19 may terminate the processing of FIG. 8. In a case where the user setting value is the value that permits the lighting control (Y in step ST63), the lamp ECU 19 may cause the processing to proceed to step ST64.

In step ST64, the lamp ECU 19 may start up the processing of the lighting state control of the automated driving indicator lamp 5 during the execution of the automated driving. The processing to be started up here may be, for example, the processing of FIGS. 5, 6, and 7. In the case with the user's permission to carry out the lighting control of the automated driving indicator lamp 5 during the execution of the automated driving (Y in step ST63), the automated driving indicator lamp 5 has its lighting state controlled during the execution of the automated driving, on the basis of the user setting.

Meanwhile, in the case with the user's inhibition from carrying out the lighting control of the automated driving indicator lamp 5 during the execution of the automated driving (N in step ST63), the process of step ST64 is not executed. The lamp ECU 19 may execute only the processing of FIG. 4. In this case, the automated driving indicator lamp 5 has no longer its lighting state controlled during the execution of the automated driving. Thus, the automated driving indicator lamp 5 is kept on during the execution of the automated driving.

As described, the lamp ECU 19 is configured to control whether or not to change the lighting state of the automated driving indicator lamp 5 during the execution of the automated driving, on the basis of the user setting regarding the lighting control of the automated driving indicator lamp 5 during the execution of the automated driving.

It is to be noted that the lamp ECU 19 may control lighting states of other lamps than the automated driving indicator lamp 5, on the basis of user setting, in accordance with, for example, whether or not the automated driving is in execution. For example, the lamp ECU 19 may control the lighting states of other lamps than the automated driving indicator lamp 5, in accordance with the lighting control of the automated driving indicator lamp 5 during the execution of the automated driving.

As described, in this embodiment, the lamp ECU 19 is configured to switch on the automated driving indicator lamp 5 during the execution of the automated driving in which the automated driving and driver assistance ECU 14 of the automobile 1 controls the travel of the automobile 1 by the automated driving. The automated driving indicator lamp 5 indicates that the travel control state of the automobile 1 is the automated driving. Hence, it is possible for those outside the automobile 1, e.g., the pedestrian 3 and/or the occupant of the surrounding automobile 2, to recognize that the automobile 1 is executing the automated driving.

Moreover, in this embodiment, the lamp ECU 19 is configured, not to keep the automated driving indicator lamp 5 on during the execution of the automated driving, but to change the lighting state of the automated driving indicator lamp 5, in accordance with the presence of the surrounding moving body around the automobile 1 and the kind of the surrounding moving body, in the case where the place being traveled by the automobile 1 executing the automated driving is the exclusive place for the automated driving.

In one specific but non-limiting example, the lamp ECU 19 is basically configured to switch off the automated driving indicator lamp 5 during the execution of the automated driving, in the case where the automobile 1 is traveling by the automated driving in the exclusive place for the automated driving.

Moreover, in the case where the surrounding moving body comes over near the automobile 1 while the automobile 1 is traveling by the automated driving in the exclusive place for the automated driving, with the automated driving indicator lamp 5 off, the lamp ECU 19 is configured to switch the automated driving indicator lamp 5 back on during the execution of the automated driving, in accordance with the attributes of the surrounding moving body with respect to the exclusive place for the automated driving.

For example, the lamp ECU 19 may keep the automated driving indicator lamp 5 off during the execution of the automated driving, in the case where the surrounding moving body present around the automobile 1 is a moving body that belongs to the exclusive place for the automated driving. The lamp ECU 19 may switch the automated driving indicator lamp 5 back on that has been off during the execution of the automated driving, in the case where the surrounding moving body is a moving body other than the moving body that belongs to the exclusive place for the automated driving.

The automated driving indicator lamp 5 is expected to be kept on during the execution of the automated driving, to indicate that the automobile 1 is executing the automated driving. Meanwhile, in the exclusive place for the automated driving, the illumination of the automated driving indicator lamp 5 is assumed to be basically unnecessary. Switching basically off the automated driving indicator lamp 5 in the exclusive place for the automated driving leads to reduction in the power consumption of the automated driving indicator lamp 5, without inhibiting the automated driving indicator lamp 5 from giving notification by its illumination to the surrounding moving body. Hence, it is possible to reduce the power consumption of the automated driving indicator lamp 5, in comparison to a case where the automated driving indicator lamp 5 is kept on. This allows for reduction in wasteful power consumption.

Furthermore, even if the automobile 1 is traveling by the automated driving in the exclusive place for the automated driving as described above, the lamp ECU 19 may switch the automated driving indicator lamp 5 back on that has been off during the execution of the automated driving, in the case with the presence of the surrounding moving body other than the moving body that belongs to the exclusive place for the automated driving.

Hence, it is possible to switch the automated driving indicator lamp 5 back on, to give the notification by its illumination that the automobile 1 is executing the automated driving, to the moving body that entered the exclusive place for the automated driving that basically does not assume the entry of anything other than autonomous cars. Specific but non-limiting examples of such moving body may include the pedestrian 3 and the surrounding automobile 2 that is not executing the automated driving.

In the exclusive place for the automated driving, the automobile 1 is configured to travel by the automated driving, with the automated driving indicator lamp 5 off. In such an exclusive place for the automated driving, the lamp ECU 19 may keep the automated driving indicator lamp 5 off, regardless of the presence of staff members working there or management vehicles traveling there. This leads to effective reduction in the power consumption of the automated driving indicator lamp 5. Staff members and occupants of management vehicles who work in the exclusive place for the automated driving are basically expected to recognize, as background knowledge, that the automobile 1 executing the automated driving keeps the automated driving indicator lamp 5 off in the exclusive place for the automated driving. It is, therefore, plausible that staff members and occupants of management vehicles be able to recognize that the automobile 1 is executing the automated driving, even if the automated driving indicator lamp 5 is kept off.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing embodiments, in the case with the change in the lighting state of the automated driving indicator lamp 5, the alarm ECU 20 may output the alarm sound from the external speaker 61.

In one alternative, for example, in the case with the change in the lighting state of the automated driving indicator lamp 5, the external communication ECU 17 may transmit the travel control state of the automobile 1 as the communication data.

Moreover, in the case with the automated driving indicator lamp 5 off during the execution of the automated driving, the external communication ECU 17 may periodically transmit, as the communication data, the travel control state of the automobile 1 being the automated driving in execution.

In the case with the automated driving indicator lamp 5 off during the execution of the automated driving, the alarm ECU 20 may output the alarm sound at intermittent time intervals from the external speaker 61.

In the case with the automated driving indicator lamp 5 off during the execution of the automated driving, the UI operation ECU 18 may provide continuous display of information indicating that the automated driving indicator lamp 5 is off during the execution of the automated driving.

In the forgoing embodiments, all of the determination processes described in FIGS. 5 to 8 are performed in the lamp ECU 19.

In one alternative, for example, some or all of the determination processes described in FIGS. 5 to 8 may be performed otherwise than by the lamp ECU 19. For example, some or all of the determination processes described in FIGS. 5 to 8 may be performed by the automated driving and driver assistance ECU 14.

The automated driving and driver assistance ECU 14 and the lamp ECU 19 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the automated driving and driver assistance ECU 14 and the lamp ECU 19. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the automated driving and driver assistance ECU 14 and the lamp ECU 19 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An automated driving enabled vehicle, comprising:
a travel controller configured to control travel of the vehicle while switching a travel control state between automated driving and manual driving;
an automated driving indicator lamp configured to be switched on perceptibly from outside the vehicle on an occasion of the automated driving; and
a lamp controller configured to switch on the automated driving indicator lamp to indicate that the travel control state is the automated driving, during execution of the automated driving in which the travel controller controls the travel of the vehicle by the automated driving,
the lamp controller being configured to
acquire, during the execution of the automated driving, attribute information regarding a place being traveled by the vehicle, and information regarding a surrounding moving body present around the vehicle,
switch off the automated driving indicator lamp during the execution of the automated driving, on a condition that the vehicle executing the automated driving is traveling in an exclusive place for the automated driving, and
switch the automated driving indicator lamp back on during the execution of the automated driving, in accordance with attributes of the surrounding moving body with respect to the exclusive place for the automated driving, on a condition that the surrounding moving body is present around the vehicle while the vehicle is traveling by the automated driving in the exclusive place for the automated driving, with the automated driving indicator lamp off.

2. The automated driving enabled vehicle according to claim 1, wherein
the lamp controller is configured to
keep the automated driving indicator lamp off during the execution of the automated driving, on a condition that the surrounding moving body present around the vehicle is a moving body that belongs to the exclusive place for the automated driving, and
switch the automated driving indicator lamp back on that has been off during the execution of the automated driving, on a condition that the surrounding moving body present around the vehicle is a moving body other than the moving body that belongs to the exclusive place for the automated driving.

3. The automated driving enabled vehicle according to claim 2, wherein
the lamp controller is configured to
keep the automated driving indicator lamp off during the execution of the automated driving, on a condition that the lamp controller determines that the surrounding moving body other than a moving body related to the exclusive place for the automated driving has a recognition of presence of the vehicle, and
switch the automated driving indicator lamp back on that has been off during the execution of the automated driving, on a condition that the lamp controller determines that the surrounding moving body other than the moving body that belongs to the exclusive place for the automated driving lacks the recognition of the presence of the vehicle.

4. The automated driving enabled vehicle according to claim 2, wherein
the lamp controller is configured to
keep the automated driving indicator lamp off during the execution of the automated driving, on a condition that the surrounding moving body other than a moving body that belongs to the exclusive place for the automated driving comprises an autonomous vehicle, and
switch the automated driving indicator lamp back on that has been off during the execution of the automated driving, on a condition that the surrounding moving body other than the moving body that belongs to the exclusive place for the automated driving comprises a vehicle other than the autonomous vehicle.

5. The automated driving enabled vehicle according to claim 2, wherein
the lamp controller is configured to switch the automated driving indicator lamp back on, and afterwards, switch off the automated driving indicator lamp, on a condition that the travel controller switches the travel control state of the vehicle from the automated driving after the lamp controller switches off the automated driving indicator lamp during the execution of the automated driving.

6. The automated driving enabled vehicle according to claim 2, wherein
the lamp controller is configured to switch the automated driving indicator lamp back on that has been off during the execution of the automated driving, on a condition that an abnormality or a disturbance that affects the travel of the vehicle is detected or predicted, with the automated driving indicator lamp off during the execution of the automated driving.

7. The automated driving enabled vehicle according to claim 2, wherein
the lamp controller is configured to change, during the execution of the automated driving, a lighting state of the automated driving indicator lamp on a basis of user setting regarding a lighting control of the automated driving indicator lamp during the execution of the automated driving.

8. The automated driving enabled vehicle according to claim 2, further comprising an alarm device configured to output an alarm, on a condition that the lamp controller changes a lighting state of the automated driving indicator lamp during the execution of the automated driving in which the travel controller controls the travel of the vehicle by the automated driving.

9. The automated driving enabled vehicle according to claim 1, wherein
the lamp controller is configured to
keep the automated driving indicator lamp off during the execution of the automated driving, on a condition that the lamp controller determines that the surrounding moving body other than a moving body that belongs to the exclusive place for the automated driving has a recognition of presence of the vehicle, and
switch the automated driving indicator lamp back on that has been off during the execution of the automated driving, on a condition that the lamp controller determines that the surrounding moving body other than the moving body that belongs to the exclusive place for the automated driving lacks the recognition of the presence of the vehicle.

10. The automated driving enabled vehicle according to claim 1, wherein
the lamp controller is configured to
keep the automated driving indicator lamp off during the execution of the automated driving, on a condition that the surrounding moving body other than a moving body that belongs to the exclusive place for the automated driving comprises an autonomous vehicle, and
switch the automated driving indicator lamp back on that has been off during the execution of the automated driving, on a condition that the surrounding moving body other than the moving body that belongs to the exclusive place for the automated driving comprises a vehicle other than the autonomous vehicle.

11. The automated driving enabled vehicle according to claim 1, wherein
the lamp controller is configured to switch the automated driving indicator lamp back on, and afterwards, switch off the automated driving indicator lamp, on a condition that the travel controller switches the travel control state of the vehicle from the automated driving after the lamp controller switches off the automated driving indicator lamp during the execution of the automated driving.

12. The automated driving enabled vehicle according to claim 1, wherein
the lamp controller is configured to switch the automated driving indicator lamp back on that has been off during the execution of the automated driving, on a condition that an abnormality or a disturbance that affects the travel of the vehicle is detected or predicted, with the automated driving indicator lamp off during the execution of the automated driving.

13. The automated driving enabled vehicle according to claim 1, wherein
the lamp controller is configured to change, during the execution of the automated driving, a lighting state of the automated driving indicator lamp on a basis of user setting regarding a lighting control of the automated driving indicator lamp during the execution of the automated driving.

14. The automated driving enabled vehicle according to claim 1, further comprising an alarm device configured to output an alarm, on a condition that the lamp controller changes a lighting state of the automated driving indicator lamp during the execution of the automated driving in which the travel controller controls the travel of the vehicle by the automated driving.

* * * * *